United States Patent

[11] 3,596,032

| [72] | Inventor | John W. Roossinck<br>7032 Pine Island Drive, Comstock Park,<br>Mich. 49321 |
|---|---|---|
| [21] | Appl. No. | 867,529 |
| [22] | Filed | Oct. 20, 1969 |
| [45] | Patented | July 27, 1971 |

[54] COVER FOR PAD-MOUNT TRANSFORMERS
8 Claims, 8 Drawing Figs.

[52] U.S. Cl. ............................................. 200/168 A
[51] Int. Cl. ............................................. H01h 9/02
[50] Field of Search ............................................. 317/99,
112, 119, 120; 300/168; 174/5, 66, 138.4

[56] References Cited
UNITED STATES PATENTS
| 2,727,965 | 12/1955 | Toth et al. | 200/166 (B) |
| 3,179,762 | 4/1965 | Swinney | 200/168 (A) (X) |
| 3,283,062 | 11/1966 | D'Entremont | 174/138(.4) |
| 3,457,360 | 7/1969 | D'Entremont | 174/5 (X) |

Primary Examiner—H. O. Jones
Attorney—Woodhams, Blanchard and Flynn

ABSTRACT: A protective cover particularly adapted for use with a pad-mounted cabinet containing high voltage load-breaking parts of an underground residential or commercial electrical lighting system. The cover is of a nonconductive material and has a stationary flap and a pair of pivotal flaps which, when the cover is positioned within the cabinet, are adapted to cover the electrical terminals. By swinging one of the flaps into an upward position prior to installation of the cover within the cabinet, one of the terminals can be exposed to permit servicing of the line connected to the exposed terminal while the remaining terminals are covered and thus remain energized.

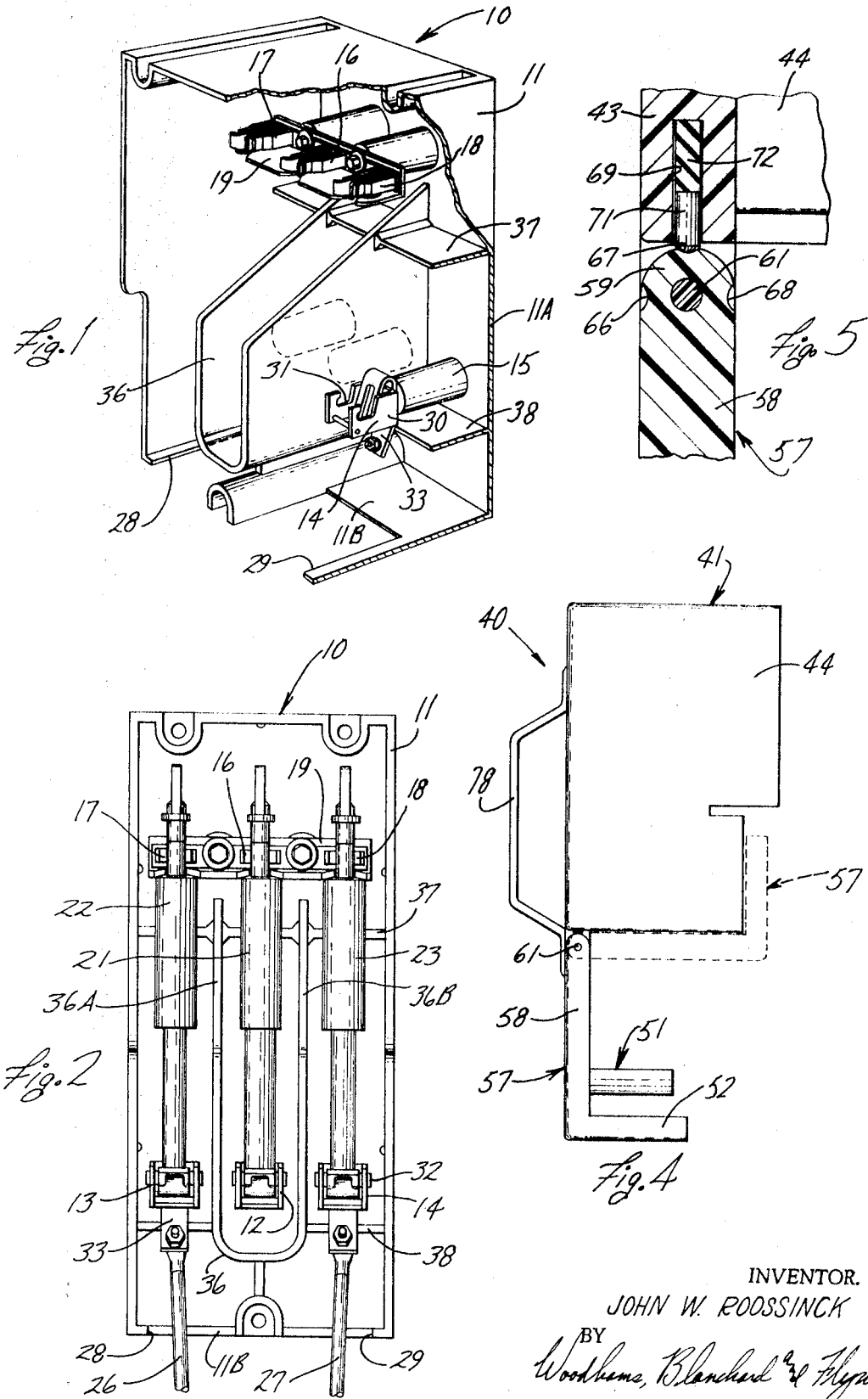

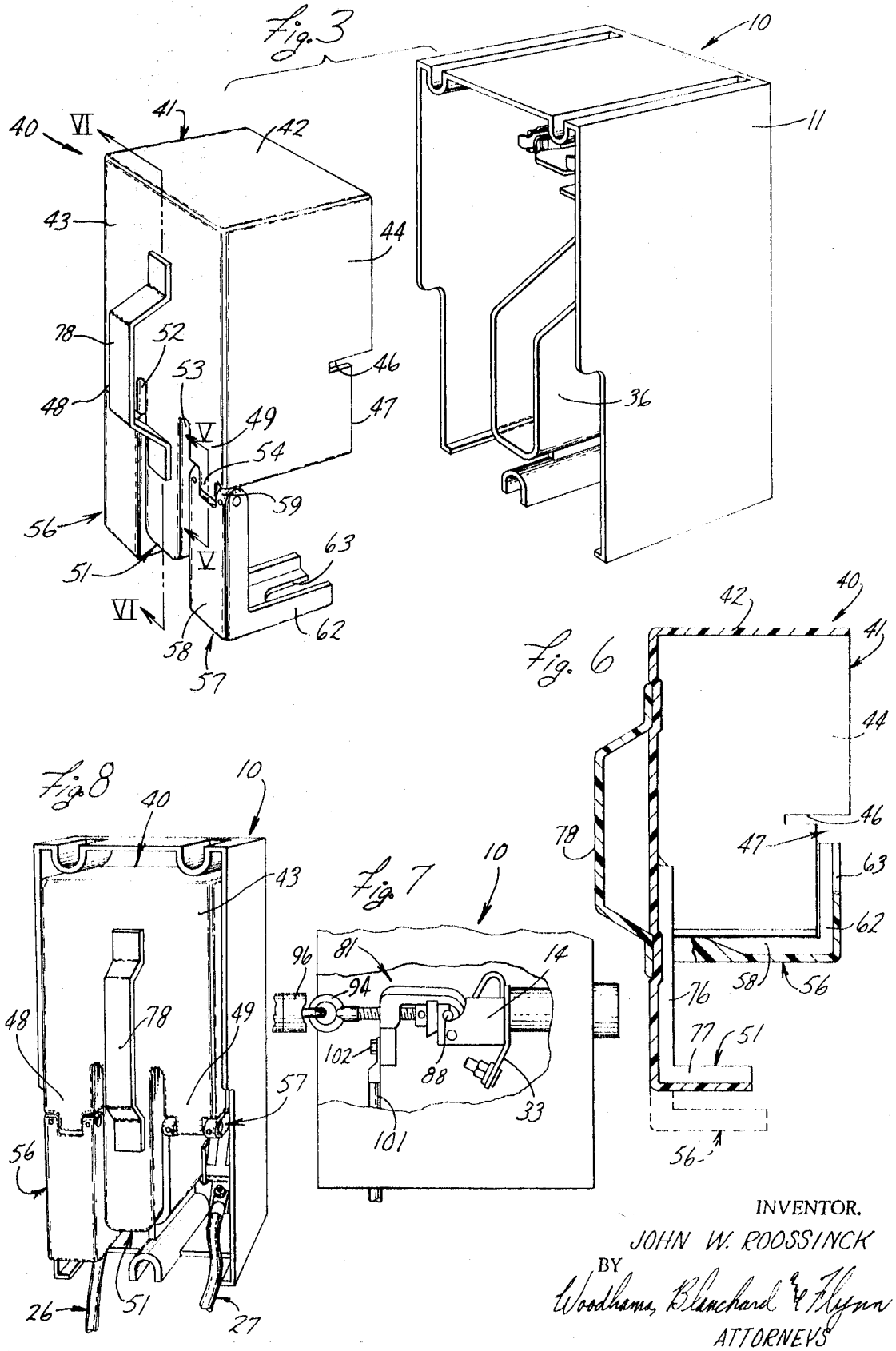

COVER FOR PAD-MOUNT TRANSFORMERS

FIELD OF THE INVENTION

This invention relates to a special protective cover adapted to be removably positioned within a cabinet containing electrical switching or load-breaking mechanisms. The cover has movable flaps for permitting a selected one of the switching or load-breaking terminals to be exposed for servicing.

BACKGROUND OF THE INVENTION

Underground residential electrical systems are finding increasing popularity in new residential developments. These underground systems, as the terminology implies, have their distribution and supply cables run below ground level. Supply cables bring high voltage current to a series of so-called pad-mount transformers, each of which supplies a calculated number of residences with reduced or house current. Each such transformer, besides requiring a connection to a high voltage supply cable, also includes a switching, load-breaking device, contained in a special cabinet, which routes current to the next unit, and on to the next, returning finally to its source, thus generally forming a loop in so doing. This switching device, which also incorporates a fuse for the transformer itself, has high tension cables running in and out. Because the switching device is above ground level, it is extremely hazardous unless properly protected. Further, because it is very compact and confined, servicing of the switching device is difficult and potentially dangerous.

Prior to the present invention, isolation of a section of underground cable between a pair of pad-mount transformers required that both these transformers be disconnected from service to allow the grounding and safe disconnection of this affected cable section from its respective breaker box on each end.

The above procedure was found necessary in order to ensure the safety of the maintenance personnel while they perform their service operation on the breaker box. However, this operation is undesirable since it results in the disruption of electrical service to numerous other lines in addition to the cable section being serviced. Also, it is desirable to keep all of the transformers along the loop electrically alive and thus this can be done only by keeping the preceding transformers alive, which is not possible according to the servicing procedure as outlined above.

A still further problem associated with the above-mentioned prior servicing procedure has been the inability to attach a grounding clamp safely to the desired terminal while the box is still electrically alive. None of the prior known clamp systems have been suitable for attachment to the terminal for grounding same in a safe manner while the remaining terminals of the breaker box are still electrically alive.

Accordingly, it is an object of this invention:

1. To provide a protective cover for use with a pad-mounted electrical cabinet, such as a breaker box, associated with an underground electrical network.

2. To provide a cover, as aforesaid, constructed of nonconductive material and adapted to be positioned within a breaker box for permitting servicing of the electrical circuit components in the breaker box while ensuring the protection of the service personnel.

3. To provide a cover, as aforesaid, having portions which enclose the live terminals of the breaker box when the cover is in position.

4. To provide a cover, as aforesaid, having movable flaps which, when in an extended position, cover the terminals of the individual loop cables with movement of a selected one of the flaps into a raised position permitting a selected terminal to be exposed for permitting servicing thereof.

5. To provide a cover, as aforesaid, having a stationary flap extending downwardly and positioned between a pair of movable flaps, the stationary flap enclosing the live transformer input terminal when the cover is positioned within the breaker box.

6. To provide a cover, as aforesaid, which can be easily and inexpensively manufactured.

7. To provide a cover, as aforesaid, which is easy to utilize and provides maximum safety protection for service personnel, and which is of a durable construction and of light weight to facilitate positioning within and removal from the breaker box.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a perspective view, partially broken away, illustrating a conventional pad-mounted breaker box.

FIG. 2 is a front view of the breaker box illustrated in FIG. 1 and showing same with the fuse and load breakers positioned therein.

FIG. 3 is a perspective view of a cover constructed according to the present invention and illustrating its relationship with the breaker box illustrated in FIG. 1.

FIG. 4 is a side-elevational view of the cover illustrated in FIG. 3 and showing in dotted lines one of the protective flaps positioned in the "up" position for permitting access to one of the breaker box terminals.

FIG. 5 is an enlarged cross-sectional view, taken along the line V–V of FIG. 3, illustrating the pivotal connection between the main section of the cover and one of the movable flaps.

FIG. 6 is a central sectional view of the protective cover taken along the line VI–VI of FIG. 3, same being illustrated with the flap in the "up" position.

FIG. 7 is a broken away side-elevational view illustrating a grounding clamp fixedly positioned on one of the terminals of the breaker box, and additionally illustrating the manner in which the grounding clamp is positioned on the terminal by means of an elongated Hotstick.

FIG. 8 is a front view illustrating the protective cover in position within the breaker box, the right cover flap being in its "up" position for permitting a ground cable to be connected to the exposed terminal.

Certain terminology will be used in the following description for convenience in reference only and will not be limiting. For example, the terms "inwardly" and "outwardly" will refer to directions toward and away from, respectively, the geometric center of the device and designated parts thereof. The terms "rightwardly" and "leftwardly" will refer to directions in the drawings to which reference is made. Said terminology will include the words specifically mentioned, derivatives thereof and words of similar import.

SUMMARY OF THE INVENTION

The objects and purposes of the invention are met by providing a protective cover constructed of insulating material, such as fiberglass, the cover being particularly suitable for use with a conventional, commercially available, pad-mounted, breaker cabinet, identified as a "Rosite" box. The cover comprises an open boxlike structure which slides as a unit into the compartments of the breaker box. The cover has two hingedly mounted substantially L-shaped cover flaps which, when in a downwardly extending position, cover cable terminals located within the box. Pivotal movement of one of the flaps into an upward position prior to installation of the cover within the box and after the respective load breaker has been removed permits access to one of the cable terminals so as to permit attachment of a ground cable thereto after the selected section of cable has been deenergized at both ends.

DETAILED DESCRIPTION

FIGS. 1 and 2 disclose therein a pad-mounted breaker cabinet 10, identified as a "Rosite" box, with which are utilized the protective cover and special grounding clamp according to the present invention. The breaker cabinet or box 10 comprises a boxlike housing 11 having a center transformer terminal 12, which terminal is directly connectable to a suitable transformer by means of an interconnecting stud which extends through an opening provided in the backwall 11A of the box 10. Suitable left and right cable terminals 13 and 14, respectively, are provided on opposite sides of the transformer terminal 12, the cable terminals 12, 13 and 14 being mounted on the box 11 by means of suitable insulating mounting sleeves 15 which are fixedly, here integrally, connected to the backwall of the box.

The box 10 is provided with a further series of terminals therein which includes a center terminal 16, a left terminal 17 and a right terminal 18, which terminals are spaced directly above the lower terminals 12, 13 and 14, respectively. The upper terminals 16, 17 and 18 are interconnected by a common bus bar 19.

As illustrated in FIG. 2, the transformer terminal 12 and the upper center terminal 16 are electrically connected by means of a conventional fuse device 21. The upper and lower left terminals 13 and 17 are similarly interconnected by a load-breaker device 22, and the upper and lower right terminals 14 and 18 are also interconnected by another load-breaker device 23. The load-breaker devices 22 and 23 supply, or interrupt, electrical energy from input terminal 13, in which case terminal 14 becomes output terminal, or vice versa, to the upper bus bar 19 and through fuse device 21 to the transformer input terminal 12. Lower terminals 13 and 14 are in turn connected to suitable load cables 26 and 27, respectively, which load cables are part of the loop of an underground electrical system. As illustrated in FIG. 2, the bottom wall 11B of the box 11 is provided with suitable openings 28 and 29 for permitting the load cables 26 and 27, respectively, to extend therethrough.

Each of the lower terminals 12, 13 and 14 comprises a substantially U-shaped base portion 30 (FIG. 1) having substantially parallel outstanding legs, each leg being provided with a suitable slot 31 therein. The lower end of the breaker devices 21, 22 and 23 are each provided with suitable pivot pins 32 thereon, which pivot pins are adapted to be positioned within the slots 31 for connecting each load-breaker device to its respective terminal. The cable terminals 13 and 14 are additionally provided with a downwardly extending flange 33 fixedly connected to the base portion 30, the flange 33 being provided with a suitable fastening member thereon for permitting attachment of one of the load cables 26 or 27 thereto.

The boxlike housing 11 is further provided with a U-shaped protective wall 36 fixedly and integrally connected to the backwall 11A of the housing and extending outwardly therefrom. The U-shaped protective wall 36 is positioned in surrounding relationship to the transformer terminal 12 and includes substantially parallel sidewalls 36A and 36B which separate the transformer terminal 12 from the adjacent left and right cable terminals 13 and 14, respectively. Suitable planar braces 37 and 38 are fixedly interconnected between the U-shaped protective wall 36 and the rear wall of the housing 11 to provide the necessary strength and rigidity for the protective wall 36. The box 10 is of a conventional commercially available type and further description thereof is believed unnecessary.

Considering now the protective cover which is particularly suitable for use with the breaker box 10, said cover 40 (FIGS. 3—6) comprises a boxlike housing 41 having a top wall 42, a front wall 43 and opposed identical sidewalls 44, the bottom and rear sides of the cover being open.

The sidewalls 44 are each provided with narrow slots 46 formed therein for receiving the braces 37 of the box 10. The slots 46 extend inwardly from the rear edge of the sidewalls. The sidewalls 44 are also provided with a relieved portion 47 adjacent the rear edge thereof, which relieved portions extend downwardly from the slots 46. The relieved portions 47 receive the legs 62 of the flaps when the flaps are in the "up" position as hereinafter further described.

The front wall 43 of the cover 40 is provided with a pair of downwardly extending side portions 48 and 49 adjacent the opposite sides thereof and additionally has an elongated central extension 51 extending downwardly therefrom and positioned intermediate the side portions 48 and 49. The central extension 51 is spaced from the side portions 48 and 49 by means of intermediate slots 52 and 53, respectively. The central extension 51 is adapted to be received within the wall 36 for covering terminal 12 and device 21 and the lower portions of sidewalls 36A and 36B are receivable in the slots 52 and 53.

Each of the side portions 48 and 49 further has a downwardly extending lug or projection 54 formed thereon for enabling substantially L-shaped flaps 56 and 57 to be pivotally interconnected to the boxlike housing portion 41. The L-shaped flaps 56 and 57, which are substantially identical, each include a leg 58 which is channel-shaped in cross section and which is provided with a fork 59 at its upper end. The fork 59 embraces the lug 54 therebetween and a pivot pin 61 extends through the lug 54 and the fork 59 for pivotally connecting the flap to the boxlike housing 41. Each flap 56 and 57 is provided with a further leg 62 which also is channel-shaped in cross section and which is fixedly, here integrally, connected to the channel-shaped leg 58 adjacent the lower end thereof. The legs 58 and 62 are substantially perpendicular to one another. The legs 62 are each additionally provided with an elongated slot 63 therein adjacent the free end thereof. The slots 63 are adapted to receive the cables 26 and 27 when the flaps 56 and 57 are in the "down" position as illustrated in FIG. 3.

The fork end 59 of the leg 58 is, as illustrated in FIG. 5, provided with a plurality of recesses 66, 67 and 68 formed therein, which recesses are spaced approximately 90° apart. Recesses 66, 67 and 68 are adapted to receive therein the end of a detent pin 71, which pin 71 is slideably received within a bore 69 formed in the boxlike housing 41. The pin 71 is resiliently urged outwardly so as to engage one of the recesses by means of a springlike resilient plug 72. Engagement of pin 71 within one of the recesses resiliently holds the flap 56 or 57 in one of a plurality of selected positions, such as in the "down" position illustrated in solid lines in FIG. 4 or in the "up" or raised position illustrated by dotted lines in FIG. 4.

Considering now the central extension 51, same includes a first channel-shaped leg 76 (FIG. 6) which is fixedly, here integrally, connected at its upper end to the front wall 43. The lower end of the leg 76 is integrally connected to a further channel-shaped leg 77 which extends inwardly from the leg 76 in a direction substantially perpendicular thereto. As illustrated in FIG. 3, the length of the central extension 51, as defined by the length of the first channel-shaped leg 76, is less than the length of flaps 56 and 57 so that the lower leg 77 is spaced upwardly from the lower legs 62 of the flaps 56 and 57 when the flaps are in their "down" position. The extra length of flaps 56 and 57 enable them to cover the flanges 33 and the conductive fittings on cables 26 and 27 when said flaps are in the "down" position.

The protective cover 40 is further provided with a suitable handle 78 fixedly interconnected to the front wall 43 to permit the protective cover 40 to be easily gripped and manipulated.

FIG. 7 schematically illustrates a suitable ground clamp 81 for use with the box 10 after the protective cover 40 has been installed therein. The ground clamp 81 is essentially a C-clamp and it has a pair of outwardly extending pins 88, which pins are sized so as to be freely receivable within the slots 31 formed in the left and right cable terminals 13 and 14, respectively.

The threaded member of the C-clamp 81 is provided with a loop portion 94 on the outer end thereof, which loop portion cooperates with a conventional Hotstick 96 for effecting rotation of the threaded member and thereby permitting the clamp 81 to be mounted on or removed from a cable terminal. A grounding cable 101 is attached to the C-clamp by a bolt 102.

The ground clamp 81 is constructed of a conductive material, preferably bronze, to create a conductive path from the terminal to the ground cable 101. The ground cable is comprised of a conductor housed within an insulating sheath. The opposite end of the cable 101 can be connected to ground in any suitable way.

OPERATION

When it is desired to service one of the underground cables, such as the cable 27, the service personnel will use a Hotstick for gripping the right breaker 23, whereupon same will be pivoted outwardly and downwardly so as to disengage the breaker 23 from the right terminal 18. The breaker 23 is then completely removed from the box 10 by disengaging the lower end thereof from the right cable terminal 14. This thus isolates the cable 27 from the live bus bar 19, which is still connected to a suitable live transformer.

The protective cover 40 is then installed within the box 10 so as to totally enclose the live or electrically energized components thereof, said installation being accomplished by gripping the box with a Hotstick or by means of a service man gripping the handle 78 of the cover 40 while wearing rubber gloves and sleeves. Prior to installation of the cover within the box, the left-hand flap 56 will be positioned in its "down" position (as shown by solid lines in FIG. 4) and the right-hand flap 57 will be pivotally moved forwardly into its "up" position (as illustrated by dotted lines in FIG. 4), the flaps being held in the respective positions by means of the detent assembly illustrated in FIG. 5.

The cover 40 will then be slideably inserted into the interior of the box 10, the sidewalls 44 of the cover being positioned closely adjacent to and slightly spaced inwardly from the respective sidewalls of the box 10. During the installation, the center extension 51 will be slideably received within the U-shaped protective wall 36 whereupon the center extension 51 will thus enclose the transformer terminal 12. In a similar manner, the leftward flap 56, being positioned in its "down" position, will cover the left cable terminal 13, both from the front by means of the channel-shaped lug 58 and from the bottom by means of the channel-shaped leg 62. The recess 63 formed in the leg 62 permits the still energized cable 26 to pass therethrough. The upper terminals 16, 17 and 18 and the interconnecting bus bar 19 are all completely and totally enclosed by means of the boxlike housing portion 41. Since the right-hand flap 57 is in its "up" position, it will be positioned above the right-hand cable terminal 14 such that said terminal will be exposed (as illustrated in FIG. 8) when the cover is inserted within the box. The terminal 14 can then be safely serviced since the cover 40 effectively encloses all of the other live terminals of the box. Further, the flap 57 prevents upward access to the live terminals, such as terminal 18, thereby further ensuring the safety of the service personnel.

With the cover installed as illustrated in FIG. 8, a service man will then attach a remote end of the ground cable 101 to a suitable ground connection. He will then grip the ground clamp 81 by means of a Hotstick 96, whereupon the ground clamp can then be inserted into the cable terminal 14 such that the pins 88 are received within the terminal slots 31. The threaded member will then be rotated so as to cause the plate to move into tight gripping engagement with the terminal 14. When so connected, the Hotstick is then removed and the terminal 14 is suitably grounded.

In a similar manner, the other end of the cable 27, as located at a further breaker box, is also disconnected from a suitable transformer and is grounded in the same manner as described above. After both ends of the cable loop 27 have been suitably disconnected and grounded in the above-described manner, the cable can then be safely serviced so as to discover and correct any faults therein.

Thus, the use of the above-described protective cover 40 greatly enhances the safety of performing maintenance on live underground electrical networks and speeds up and makes more feasible the isolation and repair of faulted sections of looped underground primary feeds. These devices make it simpler and safer to deenergize, isolate and ground a faulty section of cable for repairs, and restore it to service without deenergizing transformers adjacent to the fault or interrupting electricity to other lines supplied from these transformers.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A protective cover particularly suitable for use with an electrical switch box, comprising:
   housing means having a front wall;
   a first flap positioned on one side of said housing means and means movably interconnecting said first flap to said housing means;
   a second flap positioned adjacent the other side of said housing means and means movably interconnecting said second flap to said housing means;
   said first and second flaps being laterally spaced apart and each being independently movable between a first position wherein said first and second flaps are substantially parallel with said front wall and a second position wherein said first and second flaps are substantially perpendicular to said front wall;
   a third flap interconnected to and extending substantially parallel with said front wall, said third flap positioned between said first and second flaps; and
   said cover constructed of an electrically nonconductive material.

2. A cover according to claim 1, wherein said first and second flaps are pivotally connected to said front wall and further including detent means coacting between said housing means and each of said first and second flaps for resiliently maintaining each of said first and second flaps in a selected one of said first and second positions.

3. A cover according to claim 1, wherein each of said first and second flaps are substantially L-shaped and include first and second substantially transverse leg portions with one of said leg portions being pivotally interconnected to said housing means adjacent the free end thereof, the other of said leg portions provided with a slot extending from the free end thereof.

4. A cover according to claim 3, further including detent means coacting between said housing means and said first and second L-shaped flaps for resiliently maintaining each of said L-shaped flaps in a selected one of said first and second positions.

5. A cover according to claim 3, wherein said third flap is fixedly connected to said housing means, said third flap being substantially L-shaped and including first and second legs with said first leg fixedly interconnected at its free end to said front wall, said second leg being substantially transverse to and fixedly interconnected to said second leg adjacent the other end thereof.

6. A cover according to claim 3, wherein said housing means includes a pair of sidewalls, a top wall extending between and interconnected to said sidewalls and interconnected to the upper edge of said front wall, said cover constructed from fiberglass.

7. A cover according to claim 6, wherein said third flap is fixedly connected to said housing means, said third flap being L-shaped and including a first leg integrally connected adjacent its upper end to said front wall and a second leg transverse to and integrally connected to said first leg adjacent the other end thereof, the second leg of said third flap being spaced upwardly from the second leg portions of said first and second flaps when said first and second flaps are in said first position, and said first and second flaps being mounted for pivotal movement about a common axis.

8. A cover according to claim 7, wherein said first and second flaps are movable between said first position wherein said first leg portions are substantially coplanar with said front wall and said second position wherein said first leg portions are positioned closely adjacent the lower edges of said sidewalls, said sidewalls each provided with a relieved portion for accommodating the second leg portions of said first and second flaps when said first and second flaps are in said second position.